Patented July 31, 1945

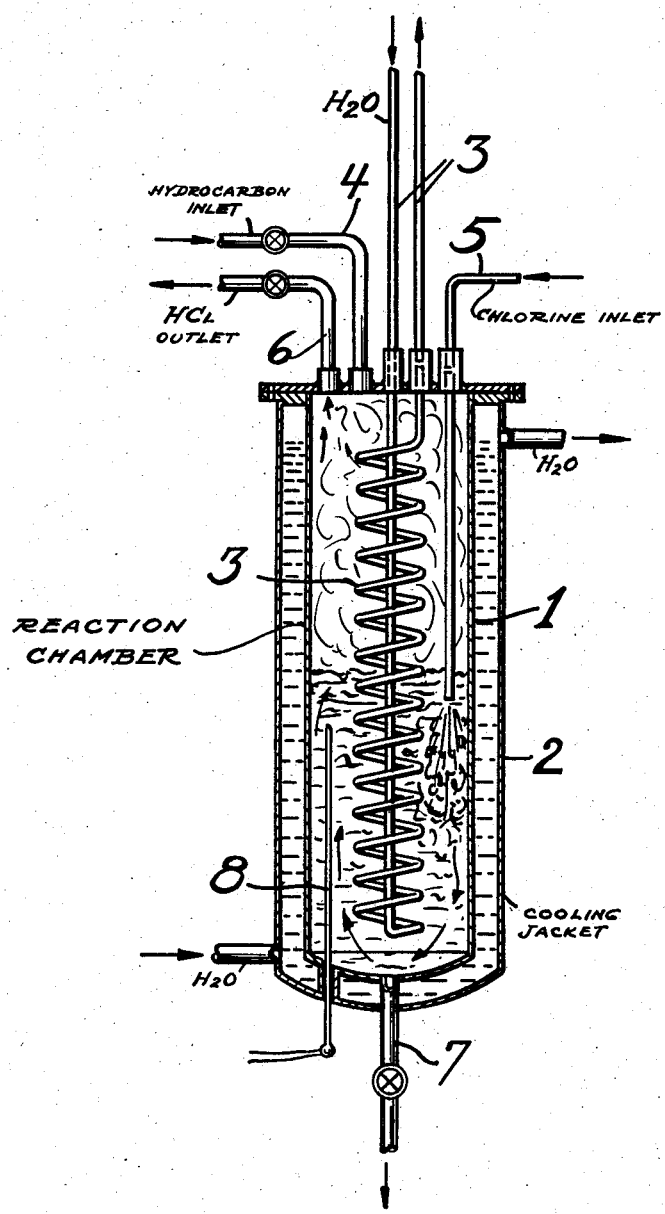

2,380,500

UNITED STATES PATENT OFFICE 2,380,500

SUBSTITUTION CHLORINATION OF TERTIARY OLEFINS

Hyym E. Buc and Clifford W. Muessig, Roselle, N. J., assignors to Standard Oil Development Company, a corporation of Delaware Application May 4, 1940, Serial No. 333,258

5 Claims. (Cl. 260—654)

This invention relates to a process for the chlorination of olefins, particularly tertiary olefins.

It is known that chlorine reacts very readily with tertiary olefins, i. e., olefins having the structure:

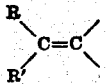

where R and R' are alkyl radicals. The reaction product obtained when chlorine is introduced into a body of a tertiary olefin consists of a mixture of chlorinated olefins, alkyl monochlorides and alkyl polychlorides. The initial reaction between chlorine and the olefin seems to be a substitution reaction, whereby chlorinated olefins are produced; but side reactions soon take place, especially in the presence of the by-product hydrogen chloride, to form saturated compounds. As an example of the formation of such mixtures of compounds may be mentioned the work of Ostromislenski, which is reported in J. Russ. Phys. Chem. Soc., 47: 1988–91 (1915); Chem. Zentr., 1916 II, 308. A typical experiment in which chlorine was passed into 100 grams of trimethylethylene resulted in a product containing 33% of chlorinated olefins, 38% of alkyl monochlorides, 16% of alkyl dichlorides, and 12% of alkyl trichlorides. Furthermore, in a test conducted by the applicants in which chlorine was introduced into a body of liquid trimethylethylene at room temperature at a rate not greater than one mol per mol of olefin per hour, the product obtained after passing in the chlorine for a period of 1.75 hours contained 40% of chlorinated olefins, 41% of alkyl monochlorides, 13% of alkyl dichlorides and 6–7% of polychlorides.

Various proposals have been made for eliminating side reactions and increasing the yields of substitution products. Engs and Redmond, in U. S. Patent 2,077,382, state that the formation of substitution compounds is favored by contacting the by-product hydrogen chloride with a suitable solvent in order to remove this by-product from the reaction zone, thus preventing its further action on the olefin compounds present. Deanesly and Hearne, in U. S. Patent 2,031,938, seek to eliminate the presence of an excess of chlorine in any portion of the reacting liquid by introducing the chlorine into the reaction chamber in the form of a stream of gas in such a manner that the chlorine gas acts to divide the liquid being treated into a spray of minute droplets. The production of polychlorides by the local reaction of an excess of chlorine with olefins is said to be minimized by this method. It can be seen that the foregoing proposals involve processes which are relatively difficult and costly. An object of the present invention is to provide an extremely simple and inexpensive procedure whereby the proportion of chlorinated olefins in the product will be substantially increased and the proportion of alkyl monochlorides and polychlorides considerably reduced.

According to the present invention, improved yields of substitution products are obtained by passing chlorine into a body of the liquid tertiary olefin, or a solution thereof, at a very rapid rate and permitting the immediate escape of by-product hydrogen chloride from the reaction zone. It has been found that the rate of introduction of chlorine may be greatly increased over the rates usually employed without any escape of chlorine from the reaction vessel; in fact, no limit has yet been found to the rate at which the chlorine may be introduced except the practical limits imposed by the necessity of providing for sufficient cooling of the reaction vessel during the process. The increased yield of substitution products seems to be due to the fact that they are formed rapidly and the by-product hydrogen chloride is rapidly forced out of the vessel by its own rapid evolution and is thus prevented from causing secondary reactions. It is preferred to introduce the chlorine at a rate at least as high as 0.05 mol of chlorine per mol of tertiary olefin per minute. Owing to the rapid introduction of the chlorine gas, no external means for agitating the liquid are necessary. It is not necessary that light or other catalytic agents be employed. The reaction should be conducted in the liquid phase and preferably at atmospheric pressure. It thus becomes necessary to provide for sufficient cooling in order to maintain the olefin in the liquid phase. The reaction temperature may be varied widely, without changing the course of the reaction, so long as it is maintained substantially below the boiling point of the olefin at the prevailing pressure. It has been found desirable, when conducting the method as a batch process, to pass in the chlorine until 50% to 75% of the olefin is converted.

The advantages of the new process may be realized not only when the olefin is in concentrated form, but also when it is in dilute solution, as in fractions obtained by the distillation of cracked petroleum oils.

The process of the invention is applicable to the chlorination of tertiary olefins in general, but its advantages are more particularly realized in the treatment of tertiary olefins containing not more than five carbon atoms. The method thus provides a practical means for converting such compounds as isobutylene and trimethylethylene, obtained as by-products in the cracking of petroleum oils, into useful products. The chlorinated olefin products may be converted into diolefins which are useful in the artificial rubber industry.

The accompanying drawing shows in sectional elevation a suitable apparatus for carrying out the process of the present invention. A reaction chamber 1 is provided with a cooling jacket 2 and an internal cooling coil 3 through which may be passed any suitable cooling liquid, such as water or brine. The hydrocarbon to be reacted is introduced through line 4, and chlorine is introduced through line 5, which extends below the surface of the liquid being treated. The hydrogen chloride evolved in the reaction is permitted to escape through outlet 6. After the reaction has been carried on to the desired extent, the contents of the reaction vessel may be removed through line 7. A thermocouple 8 extends into the body of the reacting liquid and provides for accurate observations of temperature conditions within the reaction zone. The apparatus may be constructed of nickel or other suitable material. The product of the reaction carried out in the above described apparatus may be further treated by any suitable means, such as distillation, to separate the chlorinated products from the unreacted hydrocarbon and from one another.

The reaction may be carried out either by batch or continuous methods of operation, and unreacted starting material may be advantageously recycled to the reactor to increase conversions.

The method of the present invention may be illustrated by the following example:

*Example*

About 9.2 molecular proportions of trimethylethylene were placed in a reaction vessel and gaseous chlorine was rapidly bubbled through the liquid at a rate of about 0.07 mol of chlorine per mol of trimethylethylene per minute for about 6 or 7 minutes, while maintaining a reaction temperature of 30°–35° C. About 50% of the trimethylethylene was converted into chlorinated products during this time. The latter were separated by distillation and were found to consist of 54% of chloroolefins, 18% of tertiary amyl chloride, 26% of dichlorides, and 2–3% of polychlorides.

The present invention is not to be considered as being limited in any way by the example given nor by any theory of the process. It should be considered as being limited only by the terms of the appended claims.

We claim:

1. The method of preparing chlorine substitution products of a tertiary olefin containing not more than five carbon atoms per molecule which comprises introducing chlorine into a body of the said olefin in liquid phase at the rate of at least 0.05 mol of chlorine per minute for each mol of tertiary olefin present at a given time, while maintaining in the reaction zone a temperature substantially below the boiling point of the olefin at the prevailing pressure and permitting the immediate escape of the evolved hydrogen chloride from the liquid reaction zone.

2. The method of preparing chlorine substitution products of a tertiary olefin containing not more than five carbon atoms per molecule which comprises introducing chlorine into a body of said olefin in liquid phase at atmospheric pressure at the rate of at least 0.05 mol of chlorine per minute for each mol of tertiary olefin present at a given time, while maintaining in the reaction zone a temperature substantially below the boiling point of the olefin and permitting the immediate escape of the evolved hydrogen chloride from the liquid reaction zone.

3. The method of preparing chlorine substitution products of trimethylethylene which comprises introducing chlorine into a body of liquid trimethylethylene at a temperature not higher than 35° C. and at the rate of at least 0.05 mol of chlorine per minute for each mol of trimethylethylene present at a given time, until 50% to 75% of the trimethylethylene is converted into chlorinated products, while permitting the immediate escape of the evolved hydrogen chloride from the liquid reaction zone.

4. The method of preparing chlorine substitution products of olefins which comprises introducing chlorine into a body of a homogeneous liquid comprising a substantial amount of a tertiary olefin, any other constituents having a reactivity with chlorine which is substantially less than that of the said tertiary olefin, at a rate of at least 0.05 mol of chlorine per minute for each mol of tertiary olefin present at a given time, while maintaining the said liquid at a temperature substantially below its boiling point at the prevailing pressure and permitting the immediate escape of the evolved hydrogen chloride from the said liquid.

5. The method of preparing chlorine substitution products of trimethylethylene which comprises introducing chlorine into a body of liquid trimethylethylene at a temperature not higher than 35° C. and at a rate of at least 0.05 mol of chlorine per minute for each mol of trimethylethylene present at a given time, while permitting the immediate escape of the evolved hydrogen chloride from the liquid reaction zone.

HYYM E. BUC.
CLIFFORD W. MUESSIG.